United States Patent [19]

Deppner, Jr.

[11] 4,156,027
[45] May 22, 1979

[54] LOW TEMPERATURE SAUSAGE PRODUCT AND PROCESS

[75] Inventor: Frederick W. Deppner, Jr., Overland Park, Kans.

[73] Assignee: Western Dairy Products, division of Chelsea Industries, Inc., San Francisco, Calif.

[21] Appl. No.: 848,236

[22] Filed: Nov. 3, 1977

[51] Int. Cl.² .......................... A22C 11/00; A23L 1/31
[52] U.S. Cl. ...................................... 426/272; 426/284; 426/315; 426/646; 426/105
[58] Field of Search ............... 426/105, 266, 272, 284, 426/315, 646

[56] References Cited

U.S. PATENT DOCUMENTS

| | | | |
|---|---|---|---|
| 2,893,879 | 7/1959 | Huckabee | 426/315 X |
| 2,944,909 | 7/1960 | Ziegler | 426/315 |
| 3,050,400 | 8/1962 | Poarch et al. | 426/646 |
| 3,740,235 | 6/1973 | Weiner | 426/105 X |
| 3,890,451 | 6/1975 | Keszler | 426/513 X |
| 3,943,263 | 3/1976 | Sato et al. | 426/105 X |

OTHER PUBLICATIONS

Komarik, S. L. et al., "Foods Products Formulary", vol. 1, The Avi Publ. Co., Inc., Westport, Conn., 1974, pp. 37 and 52.

*Primary Examiner*—Robert A. Yoncoskie

[57] ABSTRACT

Various meats including beef, pork and poultry are smoked under low temperature smoking conditions in which the temperature of the meat reaches no higher than approximately 100° F., following which the meats are coarse or fine ground, mixed with various additives and binders, and then processed into sausage by utilizing normal procedures.

4 Claims, No Drawings

LOW TEMPERATURE SAUSAGE PRODUCT AND PROCESS

SUMMARY OF THE INVENTION

An object of the invention is to provide a sausage product which has a unique, smoked flavor which is spread uniformly throughout the sausage and which has sufficient binding power so that it will hold together whether raw or cooked and whether in the form of patties or in the form of being stuffed into casings.

The essence of the invention is that the coarse meat of the sausage mixture is smoked at a temperature within the range of from about 70° F. to about 100° F., thereby not being denatured with a consequent loss of its binding power. As a result, the subsequent sausage product will hold together under essentially all forms and conditions, whereas the same product, except for the subjection of the coarse meat to normally internal smoking temperatures of 120° F. and higher, will not hold together under any of these forms and conditions.

Other objects and advantages of the invention will be apparent from the following description.

Several examples of the product and process of the invention are as follows, the symbol # standing for pounds.

EXAMPLE 1

Ingredients: Smoked ham, bacon, water, calcium reduced dried skim milk, salt, honey, maple syrup, sodium phosphate, sugar, sodium erythorbate, sodium nitrite.

| 250# Batch | |
|---|---|
| 220# Coarse Meats | 30# Binder Meats |
| 180# Special Smoked Cured Ham* (Shankless) | 30# Shank and trimmings from hams in opposite column |
| 40# Bacon ends and slices** | |
| 220# Total | 30# Total |
| Additives | |
| 7½# Water | |
| 7½# CRDSM (Calcium-Reduced Dried Skim Milk) | |
| 1½# Honey | |
| 1½# Maple Syrup | |
| 1½# Salt | |
| ½# Sugar | |
| 20# | |
| | 20# |
| | 50# Total |

*Smoked ham curing ingredients: Water, salt, sodium phosphate, sugar, sodium erythorbate, sodium nitrite.
**Bacon curing ingredients: Water, salt, sodium phosphate, sodium erythorbate, sodium nitrite.

Ham Selection: Use 30# up and seconds. Well chilled 34° F. to 36° F.

Boning: Skin, leave ⅛" fat above blue line. Bone by straight split method. Do not remove star fat. Leave shanks attached.

Curing: Mechanically stitch pump whole boneless hams 15% with a 30% USDA approved pickle.

Hanging: Use bacon hooks and hang by butts, shank down, or place on screens, cut side down. Hold 12 hours prior to smoking in 50° F. cooler.

Ham Smoking:

| Time | Smoke | Dry Bulb | Wet Bulb | Damper |
|---|---|---|---|---|
| ½ hr. | off | 130° F. | off | open |
| 3½ hrs. | good | 130° F. | off | closed |

Internal temperature should not be over 90° F. Remove from house. Place in 26° F./28° F. cooler for 24 hours.

I Procedures: After chilling, cut shanks from smoked hams. Keep separated. Split hams into 3 pieces.

II Binder Meats: Weigh shank and enough meat for 30#. Grind through ⅛" plate. Place in mixer and add binder additives. Mix 2 minutes. Emulsify through #10 plate or rough chop on silent cutter, or regrind through ¼" plate.

III Coarse Meats: Weigh 180# smoked ham meat and 40# bacon ends and slices. Place together in a bucket, grind through ¾" plate.
   (a) Add coarse meats to binder in mixer. Mix 2 minutes. Add 2% to 6% dry ice. Mix 2 minutes. Blend should be 32° F.–34° F.
   (b) Remove from mixer and regrind. First grind ¾" or 1" plate. Second grind ¼" or ⅜" plate.

IV Stuffing: Product can be stuffed in collagen, hog, or sheep casing. Chubs or rolls.

V Cooking: Product must be cooked to 140° F., then chilled.

EXAMPLE 2

Ingredients: Bacon, water, calcium reduced dried skim milk, salt, sugar, hickory smoke flavoring, sodium phosphate, sodium erythorbate, sodium nitrite.

| 100# Batch | |
|---|---|
| Coarse Meats (1" plate) | Binder Meats (3/16" plate) |
| 70# Bacon (whole slab)* | 15# Butts from bacon in opposite column |
| 15# Bacon ends and pieces* | |
| 85# | 15# |
| Curing Solution | Additives |
| 2# Water | 3# CRDSM |
| 1/2# Salt | 6# Water |
| 1/8# Hickory smoke flavoring | 1# Salt |
| 2# + 10 oz. | 1/2# Brown sugar |
| | 1/4# Hickory smoke flavoring |
| | 10# + 6 oz. |

*Bacon curing ingredients: Water, salt, sugar, sodium phosphate, sodium erythorbate, sodium nitrite.

Selection of green rough pork bellies

1. Use whole rough pork bellies 12# down (known to trade as skips or for slab), or 20–24# averages. Do not use stag, or heavy sow.
2. Procedure for trim.
   a. Remove skin.
   b. Remove backfat at scribe line.
   c. Remove teats on bias angle cut.
   d. Do not trim butt or blank ends.
   e. Do not remove belly facing except for button bones.

Curing: Mechanically stitch with your existing belly pickle same percentage as for slicing bellies.

Hanging: Use bacon hooks and hang regular. Hold 12 hours prior to smoking in 50° F. cooler.

Bacon Smoking: Use existing bacon smoke cycle if using natural smoke. If fogging, use slab bacon cycle.

Internal temperature when checked must be made in the lean flank and must not be over 72° F. Remove from house and place in blast chill for 24 hours. Chill to 24° F.–26° F.

I Procedures after chilling a. Cut lean butt ends from smoked, chilled bacon slabs.

b. Split remaining portion of slab into two pieces lengthwise.

II Binder Meats

Weigh enough lean butt ends for 15 pounds. Grind through 3/16" plate. Place in mixer and add binder additives. Mix 2 minutes. Emulsify through 1/16" plate or chop on silent cutter.

III Coarse Meats

Weigh 70# whole split pieces of bacon and 15# of bacon ends and slices. Place together in a bucket and grind through 1" plate.

a. Place in mixer. Add curing solution as a slurry. Mix until tacky.
b. Add binder emulsion and mix 2 minutes.
c. If product mix is for blended bacon strips regrind through 1" plate.
d. For natural or collagen casings grind through 3/16" plate.

EXAMPLE 3

Ingredients: Smoked cured ham, ham trimmings, ham shanks, water, calcium reduced dried skim milk, salt, brown sugar, hickory smoke flavoring, monosodium glutamate, sodium phosphate, sodium erythorbate, sodium nitrite.

| Coarse Meats | Binder Meats | |
|---|---|---|
| 70# Lean smoked S.P. Ham trims | 15# Smoked Ham Shanks | |
| 15# Smoked (fat) Ham trims or Bacon ends and slices | | |
| 85# | 15# | |
| Mixing Additives | Binder Additives | |
| 1½# Brown sugar | 3½# CRDSM | |
| 1 # Salt | 2 # Water | |
| 2 oz. Hickory smoke flavoring | ½# Salt | |
| 2 oz. Monsodium glutamate | ½# Brown sugar | |
| | 1 oz Hickory smoke flavoring | |
| | 1 oz Monosodium glutamate | |
| 2# 12 oz. | 6# 10 oz. | |

I. Spread ham material on smokehouse truck screens. Keep items separate and do not spread over 2 inches deep. Let hang and drain 12 to 24 hours in cooler. Weigh material.

II. Ham Smoking and Drying.

| Time | Smoke | Dry Bulb | Wet Bulb | Damper |
|---|---|---|---|---|
| As long as possible | Heavy | 90° F./100° F. | Off | open |

Internal temperature should not be over 70° F./72° F. Remove from house. Place in 26° F./28° F. cooler for 24 hours or longer. Weigh material to obtain shrinkage.

III. Procedures for making.
a. Binder meats—Grind smoked ham shanks through 3/16" plate. Place in mixer, add all additives. Mix 2 minutes and regrind through 3/16" plate.
b. Grind coarse meats through ¾" or 1" plate. Add mixing additive as paste. Mix until tacky.
c. Add binder meat emulsion to mixed coarse meats. Mix for 2 minutes, then add 5% dry ice pellets. Mix for 2 minutes. Tmeperature to be 28° F./30° F.
d. Regrind through 3/16" plate.
e. May be stuffed as roll sausage, link sausage or hog casing rope style.

EXAMPLE 4

Ingredients: Smoked cured beef, beef, water, calcium reduced dried skim milk, salt, dextrose, hydrolized vegetable protein, smoke flavoring, sugar, sodium erythorbate, sodium nitrite.

| Coarse Meats | | Binder Meats | |
|---|---|---|---|
| 90# Cured smoked beef navels 35% fat | | 20# Cow meat - 20% fat | |
| 15# Fresh lean beef - 15% fat | | | |
| 105# | | 20# | |
| Curing Solution | | Additives | |
| 9# | Water | 5# | CRDSM |
| 1-1/2# | Salt | 11# | Water |
| 1# | Dextrose | 1-1/2## | Salt |
| 1/4# | Hydrolized vegetable protein | 1# | Dextrose |
| 1/8 oz. | Sodium erythorbate | 1/4# | Hydrolized vegetable protein |
| 1/32 oz. | Sodium nitrite | 1/4# | Smoke flavoring |
| | | 1/4 oz. | Sodium erythorbate |
| | | 1/5 oz. | Sodium nitrite |
| 11#+ 12-5/32 oz. | | 19#+½ oz. | |

I.

(a) Selection of Beef Navels Boneless

Use fresh navels from prime, choice or good grade. Remove excess fat to estimated 35% fat.

(b) Selection of Beef

Use fresh meat from standard grade up. Up to 15% fat.

(c) Binder Meats

Fresh or frozen cow or bull or blends not over 20% fat.

II.

Pumping and smoking of Beef Navels (a) Pump navels with a regular ham pickle for a 15% pump, no phosphate in pumping solution.

(b) Hang with bacon hooks or spread on smoke screens. Hold for 12 to 24 hours in 38° F. cooler.

| Smoking Time | Smoke | Dry Bulb | Wet Bulb | Damper |
|---|---|---|---|---|
| 4 hours | heavy | 125° F. | off | open |

Internal temperature should not be over 90° F. Remove from house, place in 26° F.–28° F. cooler for over 24 hours.

Procedures for making

1. Grind coarse meats through 1" plate. Add curing solution as slurry, mix until tacky.
2. Binder meats - make emulsion or binder with binder meats and additives out of mill below 40° F.
3. Add emulsion to coarse meats. Mix 2 to 3 minutes. Regrind through 1" plate.
4. Form in shallow bake pans. Hold for 8 hours at 50° F.
5. Cooking:

| Time | Dry Bulb | Wet Bulb | Damper | Smoke |
|---|---|---|---|---|
| ½ hour | 120° F. | Off | Open | Off |
| 1 hour | 130° F. | Off | Open | Off |
| 1 hour | 140° F. | Off | Open | Off |
| 1 hour | 150° F. | 120° F. | Closed | Off |
| 1 hour | 160° F. | 140° F. | Closed | Off |
| 1 hour | 170° F. | 150° F. | Closed | Off |
| until internal temperature of 148° F. has been reached. | | | | |

To chill, the loaf trucks are removed from the ovens and allowed to cool for an hour. The loaves are then removed from the pans, washed using hot water, and spread on smoke house trucks with the topping side up.

These smoked blended beef strips may be smoked in the same manner as regular bacon but at 150° F. for 2 hours to develop desired color. The product is then ready for final treatment and packaging.

The product is frozen and tempered like regular bacon. A 48 hour tempering period is preferred. The product may then be sliced and packaged in the same way as bacon.

EXAMPLE 5

Ingredients: Smoked cured beef, beef, water, salt, dextrose, hydrolized vegetable protein, smoke flavoring, sugar, sodium erythorbate, sodium nitrite.

| Coarse Meats | | Binder Meats | |
|---|---|---|---|
| 65# Cured smoked beef navels 35% fat | | 20# Cow meat - 20% fat | |
| 35# Fresh lean beef - 15% fat | | | |
| 100# | | 20# | |
| Curing Solution | | Additives | |
| 5# | Water | 10# | Water |
| 1-1/2# | Salt | 1-1/2# | Salt |
| 1# | Dextrose | 1# | Dextrose |
| 1/4# | Hydrolized vegetable protein | 1/4# | Hydrolized vegetable protein |
| 1/8 oz. | Sodium erythorbate | 1/4 oz. | Sodium erythorbate |
| 1/32 oz. | Sodium nitrite | 1/5 oz. | Sodium nitrite |
| 7# 12-5/32 | oz. | 13# 1/2 | oz. |

I.

(a) Selection of Beef Navels Boneless

Use fresh navels from prime, choice or good grade. Remove excess fat to estimated 35% fat.

(b) Selection of Beef

Use fresh meat from standard grade up. Up to 15% fat.

(c) Binder Meats

Fresh or frozen cow or bull or blends not over 20% fat.

II. Pumping and Smoking of Beef Navels (a) Pump navels with a regular corned beef pickle without garlic for a 15% pump.
(b) Hang with bacon hooks or spread on smoke screens. Hold for 12 to 24 hours in 38° F. cooler.

| Smoking Time | Smoke | Dry Bulb | Wet Bulb | Damper |
|---|---|---|---|---|
| 4 hours | heavy | 125° F. | off | open |

Internal temperature should not be over 90° F. Remove from house, place in 26° F./28° F. cooler for over 24 hours.

Procedures for Making

1. Grind coarse meats through 1" plate. Add curing solution as slurry, mix until tacky.
2. Binder meats—make emulsion or binder with binder meats and additives out of mill below 40° F.
3. Add emulsion to coarse meats. Mix 2 to 3 minutes. Regrind through 1" plate.
4. Form in shallow bake pans. Hold for 8 hours at 50° F.
5. Cooking

| Time | Dry Bulb | Wet Bulb | Damper | Smoke |
|---|---|---|---|---|
| ½ hour | 120° F. | Off | Open | Off |
| 1 hour | 130° F. | Off | Open | Off |
| 1 hour | 140° F. | Off | Open | Off |
| 1 hour | 150° F. | 120° F. | Closed | Off |
| 1 hour | 160° F. | 140° F. | Closed | Off |
| 1 hour | 170° F. | 150° F. | Closed | Off |
| until internal temperature of 148° F. has been reached. | | | | |

To chill, the loaf trucks are removed from the ovens and allowed to cool for an hour. The loaves are then removed from the pans, washed using hot water, and spread on smoke house trucks with the topping side up.

The smoked blended beef strips may be smoked in the same manner as regular bacon but at 150° F. for 2 hours to develop desired color. The product is then ready for final treatment and packaging.

The product is frozen and tempered like regular bacon. A 48 hour tempering period is preferred. The product is then sliced and packaged in the same way as bacon.

It will be noted that in this example, Example 5, the amount of raw lean meat has been increased to compensate for the lack of a non-meat binder.

In all of the foregoing examples, binders other than calcium reduced dried skim milk may be used. For example, sodium caseinate, high-fat caseinate, isolated soya protein, soya protein concentrate, sodium caseinate and calcium caseinate may be used. In general, these binders as well as calcium reduced dried skim milk, may be used in amounts of about 1%–10% by weight of the end product, with the preferred range being 1%–5%. High-fat caseinate is a product made up of ½ vegetable oil and ½ sodium caseinate spray dried together as a single product.

The products of the foregoing examples have the following characteristics: they have a smoked flavor which is spread uniformly throughout the product; they have a unique flavor and aroma obtained without spices; and they are made with uniformly blended constituents which will hold together regardless of whether the product is in the form of a chilled raw product, a frozen raw product cut into patties, a cooked product chilled or frozen, a cooked product in loaf condition which has been cooked and chilled and sliced, a product stuffed into casings to be cooked later, or a product stuffed into casings followed by cooking and cooling and slicing for packaging. In short, these products are sliceable without crumbling whether cooked or raw.

The products of Examples 4 and 5 are aptly describable as beef bacon. They are sliceable into strips in the manner of bacon without any tendency to crumble.

The low temperature smoking imparts a smoked flavor to the outer layers of the pre-ground meat. Subsequent grinding of the meat results in substantially uniform distribution of the smoked flavor throughout the meat pieces, i.e. each ground meat piece is made up, through the grinding-mixing operation, of a smoked portion and an unsmoked portion, and thus each ground meat piece has a smoked flavor.

Products made by this process when raw, i.e., not cooked but packed for retail use, have a shelf life of six months as compared to a two month shelf life for raw products not made by this process.

The products of all of the foregoing examples may be formed, cooked, or smoked in any shape desired, and, if required, sliced into finished retail products.

What is claimed is:

1. A process of making a sausage product having the property of sliceability without crumbling comprising curing primary meat selected from the class consisting of beef, pork and poultry, smoking said meat in smoke of a temperature of from about 100° F. to about 130° F. but at an internal temperature not in excess of about 100° F. to avoid protein denaturing and consequent loss of binding power, thereafter coarse-grinding said meat, and then binding said meat together with an aqueous emulsion of a fine-ground portion of said smoked primary meat.

2. The process of claim 1 wherein said emulsion contains a binder selected from the group consisting of calcium reduced dried skim milk, sodium caseinate, calcium caseinate, high-fat caseinate, isolated soya protein and soya protein concentrate.

3. The process of claim 2 including stuffing the resulting bound together mixture into casings and cooking the encased mixture.

4. The process of claim 1 including forming the resulting bound together mixture into loaves and cooking the same.

* * * * *